Figure 1:
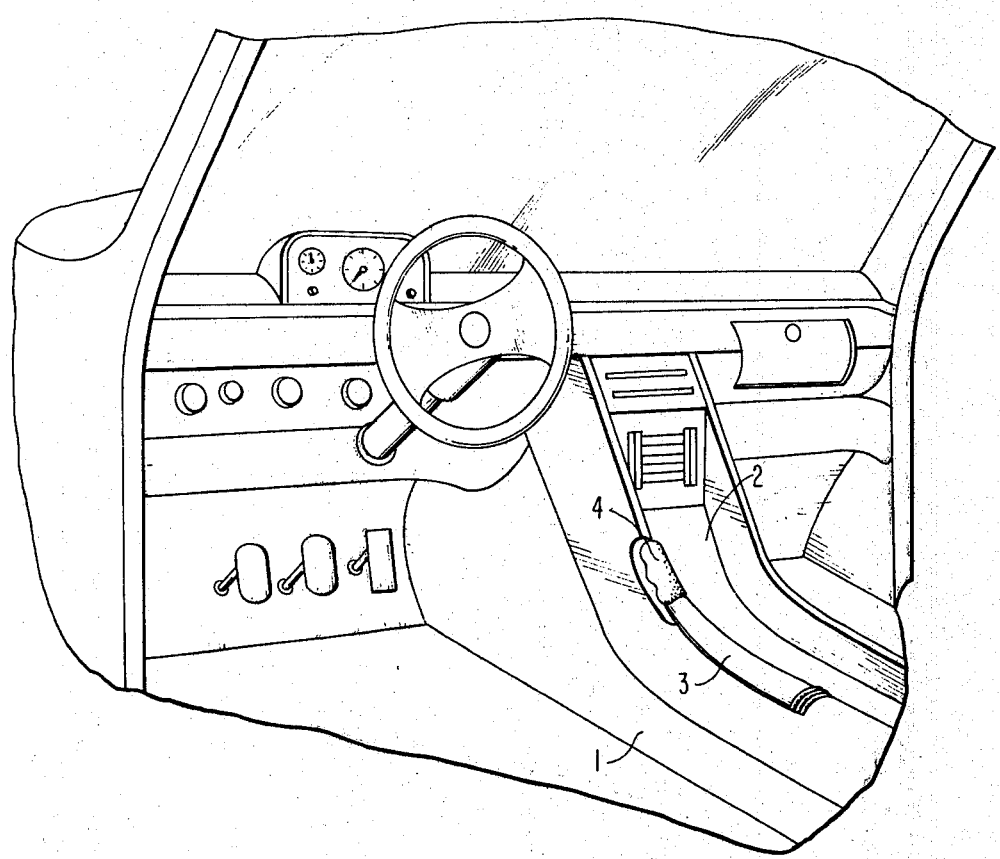

United States Patent [19]
Hoffmann

[11] 3,990,322
[45] Nov. 9, 1976

[54] HAND BRAKE ARRANGEMENT FOR MOTOR VEHICLES

[75] Inventor: Rudiger Hoffmann, Sindelfingen, Germany

[73] Assignee: Daimler-Benz Aktiengesellschaft, Germany

[22] Filed: June 27, 1975

[21] Appl. No.: 590,864

[30] Foreign Application Priority Data
June 29, 1974 Germany.............................. 2431321

[52] U.S. Cl.................................. 74/523; 74/543; 296/37 R; D12/155; D12/179
[51] Int. Cl.² ........................................ G05G 1/04
[58] Field of Search..................... 74/543, 523, 519; D12/179, 155; 296/37 R, 28 R

[56] References Cited
UNITED STATES PATENTS

| D201,795 | 8/1965 | Nimetz et al. | D12/155 |
| D205,064 | 6/1966 | Kirkby | D12/155 X |
| D216,780 | 3/1970 | Tronville et al. | D12/179 |

Primary Examiner—Samuel Scott
Assistant Examiner—F. D. Shoemaker
Attorney, Agent, or Firm—Craig & Antonelli

[57] ABSTRACT

A hand brake arrangement for motor vehicles with a storage tray arranged between the front seats thereof, preferably on a center tunnel, in which the hand brake lever is so intergrated into the storage tray that it simultaneously serves as a part of the side wall thereof.

15 Claims, 2 Drawing Figures

U.S. Patent
Nov. 9, 1976
3,990,322

HAND BRAKE ARRANGEMENT FOR MOTOR VEHICLES

The present invention relates to a hand brake arrangement for motor vehicles with a storage tray arranged between the front seats preferably on a center tunnel.

The actuating lever of the hand brake of motor vehicles was heretofore frequently arranged between the driver seat and the co-driver seat on the center tunnel of the vehicle.

Since, however, storage trays are frequently arranged at present within this area, an accommodation of the hand brake lever which is favorable from a gripping and handling point of view and which simultaneously is organically matched to the interior equipment of the vehicle, now offers generally difficulties.

For the elimination of these difficulties, a hand brake arrangement for motor vehicles with a storage tray arranged between the front seats, preferably on a center tunnel, is proposed in which according to the present invention, the hand brake lever is so integrated into the storage dish or tray that it simultaneously serves as lateral wall portion thereof.

The hand brake lever thereby fits particularly organically into the overall picture if its cross-sectional shape is matched to the cross-sectional shape of the oppositely disposed side wall of the storage tray.

A particularly safe arrangement is achieved if the hand brake lever is surrounded with foamed material. With such a construction of the present invention, a complete adaptation of the surface-structure and color to the storage tray also optically is made possible thereby.

In case covering parts of the vehicle directly adjoin the area in which the handle portion of the hand brake lever is disposed with a released brake, it is finally also of advantage if these covering parts are provided with an appropriate recess which facilitates the seizing and gripping of the handle portion.

Accordingly, it is an object of the present invention to provide a hand brake arrangement for motor vehicles which avoids by simple means the aforementioned shortcomings and drawbacks encountered in the prior art.

Another object of the present invention resides in a hand brake arrangement for motor vehicles which is favorable for purposes of gripping the same yet is organically matched to the interior equipment of the vehicle.

Still a further object of the present invention resides in a hand brake arrangement for motor vehicles, especially for a hand brake arrangement with a storage tray arranged between the front seats, preferably on a center tunnel, in which the hand brake lever is so integrated into the storage tray that it simultaneously serves as side wall portion thereof.

Still another object of the present invention resides in a hand brake arrangement for motor vehicles which is not only optically readily matched to the interior equipment but which also greatly increases the safety of operation as well as to the passengers.

Figure 2:
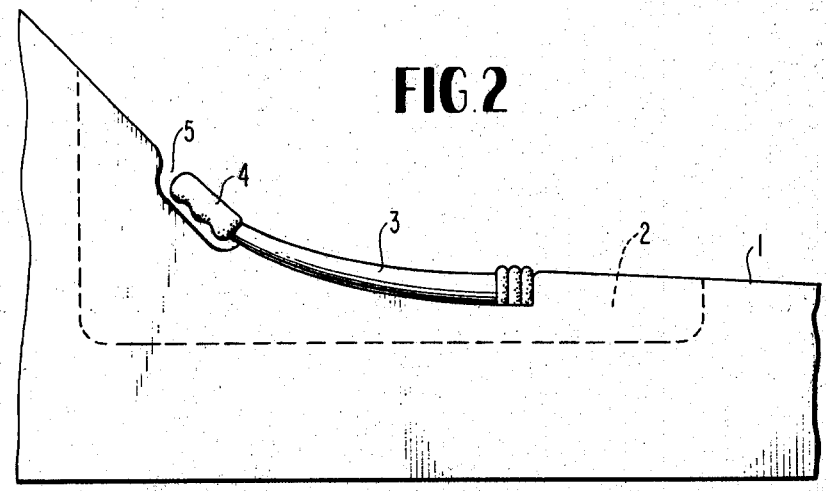

These and other objects, features, and advantages of the present invention will become more apparent from the following description when taken in connection with the accompanying drawing which shows, for purposes of illustration only, one embodiment in accordance with the present invention, and wherein:

FIG. 1 is a perspective view of the center tunnel of a passenger motor vehicle with a storage tray and hand brake arrangement in accordance with the present invention, arranged thereon; and FIG. 2 is a side elevational view, on an enlarged scale, of a part of the center tunnel illustrating also the hand brake arrangement in accordance with the present invention.

Referring now to the drawing wherein like reference numerals are used throughout the two views to designate like parts, a storage tray or dish 2 which serves for the accommodation and storage of small parts is arranged on the center tunnel 1 of the passenger motor vehicle, whose interior space is partly illustrated in FIG. 1 of the drawing. The hand brake lever 3 is so integrated into the edge of the storage tray 2 that it forms a wall portion thereof. The wall of the storage tray 2 forms within the area of the handle portion 4 of the hand brake lever 3, a recess 5 which enables a completely satisfactory gripping of the handle portion 4. The depth of the storage tray 2 should be so selected that the hand brake lever 3 does not form the entire height of the side wall, as otherwise the danger exists that small parts may slide underneath the hand brake lever 3 when the hand brake is engaged and thus impair a release of the hand brake.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hand brake arrangement for motor vehicles with a storage tray means arranged between the front seats thereof, characterized in that the hand brake arrangement includes a hand brake lever which is so integrated into the storage tray means that it serves simultaneously as a side wall portion thereof.

2. A hand brake arrangement according to claim 1, characterized in that the storage tray means is arranged on a center tunnel of the motor vehicle.

3. A hand brake arrangement according to claim 1, characterized in that the cross-sectional shape of the hand brake lever is matched substantially to the cross-sectional shape of the side walls of the storage tray means.

4. A hand brake arrangement according to claim 3, characterized in that the hand-brake lever is surrounded with foamed material.

5. A hand brake arrangement according to claim 4, characterized in that a recess means is provided in an adjoining covering part of the motor vehicle for enabling a satisfactory gripping of the handle portion within the area of the handle portion of the hand brake lever.

6. A hand brake arrangement according to claim 5, characterized in that the storage tray means is arranged on a center tunnel of the motor vehicle.

7. A hand brake arrangement according to claim 1, characterized in that the hand-brake lever is surrounded with foamed material.

8. A hand brake arrangement according to claim 1, characterized in that a recess means is provided in an adjoining covering part of the motor vehicle for enabling a satisfactory gripping of the handle portion within the area of the handle portion of the hand brake lever.

9. A hand brake arrangement according to claim 8, characterized in that the hand-brake lever is surrounded with foamed material.

10. A hand brake arrangement according to claim 1, characterized in that the normal height of a side wall of the tray means is greater than the dimension of the handle portion in the direction of such side wall.

11. An arrangement for vehicles having a storage tray for accommodating a number of individual articles, the storage tray including at least a pair of side walls defining the width thereof, the arrangement comprising a hand brake arrangement arranged at the storage tray, said hand brake arrangement including a hand brake lever which simultaneously serves as a side wall of the storage tray.

12. An arrangement according to claim 11, wherein the vehicle includes a center tunnel extending longitudinally thereof, and wherein said storage tray is arranged at a position on said center tunnel.

13. An arrangement according to claim 11, characterized in that the side walls of the storage tray have a predetermined cross-sectional configuration, and wherein the cross-sectional shape of the hand brake lever is substantially matched to the cross-sectional shape of the side wall at which said hand brake lever is arranged.

14. An arrangement according to claim 11, characterized in that the hand brake lever is surrounded with a foamed material.

15. An arrangement according to claim 11, characterized in that a recess means is provided in an adjoining cover part of the vehicle within the area of the handle portion of the hand brake lever for enabling a satisfactory gripping of the handle portion.

* * * * *